US012798296B2

(12) United States Patent
Widenor

(10) Patent No.: US 12,798,296 B2
(45) Date of Patent: Nov. 17, 2026

(54) RUBBER COMPOSITION FOR NON-PNEUMATIC SUPPORT COMPONENTS

(71) Applicant: BRIDGESTONE AMERICAS TIRE OPERATIONS, LLC, Nashville, TN (US)

(72) Inventor: Ross W. Widenor, Munroe Falls, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 380 days.

(21) Appl. No.: 18/016,206

(22) PCT Filed: Apr. 12, 2021

(86) PCT No.: PCT/US2021/026847

§ 371 (c)(1),
(2) Date: Jan. 13, 2023

(87) PCT Pub. No.: WO2022/066217

PCT Pub. Date: Mar. 31, 2022

(65) Prior Publication Data

US 2023/0271450 A1 Aug. 31, 2023

Related U.S. Application Data

(60) Provisional application No. 63/084,145, filed on Sep. 28, 2020.

(51) Int. Cl.

*B60C 7/14* (2006.01)
*B60C 1/00* (2006.01)

(Continued)

(52) U.S. Cl.

CPC ............ *B60C 7/146* (2021.08); *C08F 136/08* (2013.01); *C08K 3/04* (2013.01); *C08K 3/36* (2013.01);

(Continued)

(58) Field of Classification Search

CPC ........................ B60C 2001/0091; B60C 7/146
See application file for complete search history.

(56) References Cited

U.S. PATENT DOCUMENTS 4,003,420 A * 1/1977 Sandstrom ................ C08L 7/00 152/DIG. 12
10,507,692 B2 12/2019 Yokoyama et al.

(Continued)

FOREIGN PATENT DOCUMENTS

JP 2003072316 A 3/2003
JP 2015039987 A 3/2015

(Continued)

OTHER PUBLICATIONS

Dr. Peter Dufton; End-Of-Life Tyres-Exploiting their Value, A Rapra Industry Analysis Report-Rapra Technology Limited; 2001, ISBN: 1-85957-241-3.

(Continued)

*Primary Examiner* — S. Joseph Morano
*Assistant Examiner* — Alex Palmer
(74) *Attorney, Agent, or Firm* — Shaun J. Fox; J. Gregory Chrisman

(57) ABSTRACT

A non-pneumatic tire includes an annular inner ring, an annular outer ring, and a support structure positioned between the annular inner ring to the annular outer ring. The support structure includes a multilayer structure of a rubber skim layer and a cord embedded in the rubber skim layer. The rubber skim layer has resistance to ozone exposure without need for a protective layer overlying the rubber skim layer. The rubber skim layer exhibits adhesion to embedded metallic cords. Methods of making a non-pneumatic tire include forming a multilayer structure by applying a skin layer directly over one or more cords.

18 Claims, 6 Drawing Sheets

(51) Int. Cl.

| | |
|---|---|
| ***C08F 136/08*** | (2006.01) |
| ***C08K 3/04*** | (2006.01) |
| ***C08K 3/36*** | (2006.01) |
| ***C08L 7/00*** | (2006.01) |
| ***C08L 23/16*** | (2006.01) |

(52) U.S. Cl.

CPC ................. *C08L 7/00* (2013.01); *C08L 23/16* (2013.01); *B60C 2001/0091* (2013.01)

(56) References Cited

U.S. PATENT DOCUMENTS

| | | | | |
|---|---|---|---|---|
| 2005/0234165 | A1 | 10/2005 | Schaal | |
| 2014/0360645 | A1 | 12/2014 | Sakamoto | |
| 2018/0354304 | A1 | 12/2018 | Haidet et al. | |
| 2021/0292519 | A1* | 9/2021 | Xu | C08L 23/0815 |
| 2022/0251333 | A1* | 8/2022 | Zhang | B29B 7/90 |
| 2022/0324253 | A1 | 10/2022 | Rimai | |
| 2022/0371366 | A1 | 11/2022 | Widenor | |

FOREIGN PATENT DOCUMENTS

| | | | | |
|---|---|---|---|---|
| JP | 5919680 | B2 | 5/2016 | |
| JP | 2016113099 | A | 6/2016 | |
| JP | 2016113131 | A | 6/2016 | |
| JP | 2017013681 | A | 1/2017 | |
| KR | 19990002320 | A * | 1/1999 | C08K 5/14 |
| WO | 2018230271 | A1 | 12/2018 | |
| WO | 2019203857 | A1 | 10/2019 | |

OTHER PUBLICATIONS

Lechtenboehmer, et al.; A Review of Polymer Interfaces in Tyre Technology, British Polymer Journal 22, 1990, pp. 265-301.

* cited by examiner

RUBBER COMPOSITION FOR NON-PNEUMATIC SUPPORT COMPONENTS

FIELD

The present disclosure relates to rubber compositions for non-pneumatic tires having support structures. More particularly, the present disclosure relates to rubber compositions for use as skim coatings or surface applications for the spokes of non-pneumatic tires.

BACKGROUND

While various tire constructions enable a tire to run in an uninflated or underinflated condition, non-pneumatic tires do not require inflation. Rather, non-pneumatic tires include a plurality of spokes, webbing, cells, or other open-sided support structure that connects an inner ring to an outer ring. Some non-pneumatic tires include a tread mounted to the outer ring and a rim mounted to the inner ring.

The open-sided support structure of a non-pneumatic tire undergoes various loading conditions in operation. Moreover, dirt, water, snow, sand, mud, or other debris can come into contact with or accumulate on the open-sided support structure. While the support structure is constructed of materials selected to provide desirable structural characteristics, certain materials degrade when exposed to environmental factors such as ozone exposure. Accordingly, a spoke for a non-pneumatic tire capable of undergoing the various loading conditions of a tire while also withstanding exposure to harmful environmental factors is needed. The spokes for the non-pneumatic tire also desirably contain rubber compositions that adhere to materials selected to provide structural characteristics, such as a reinforcement member or cord.

SUMMARY

In a first aspect, there is a non-pneumatic tire that includes an annular inner ring, an annular outer ring, a support structure positioned between the annular inner ring and the annular outer ring, wherein the support structure includes a skim layer made of a rubber skim composition, the rubber skim composition including ethylene propylene diene monomer rubber, and there is a cord embedded in the skim layer.

In an example of aspect 1, the support structure includes a plurality of spokes.

In another example of aspect 1, the support structure includes an interconnected web.

In another example of aspect 1, the skim layer has an outer surface exposed to the environment and conditions around the tire, for example, ambient air.

In another example of aspect 1, the rubber skim composition is in direct contact with the cord embedded in the skim layer, for example, a metal cord having an uncoated metallic outer surface.

In another example of aspect 1, the rubber skim composition has a first surface and a second surface, the first surface being in direct contact with the cord embedded in the skim layer and the second surface exposed to the environment.

In another example of aspect 1, the rubber skim composition further includes natural rubber or polyisoprene or a combination thereof.

In another example of aspect 1, the rubber skim composition further includes about 40 to about 100 phr of natural rubber or polyisoprene.

In another example of aspect 1, the rubber skim composition further includes about 10 to about 100 phr of reinforcing filler, for example, including carbon black.

In another example of aspect 1, the reinforcing filler includes about 20 to about 80 phr of carbon black.

In another example of aspect 1, the reinforcing filler comprises about 5 phr or less of silica, or optionally substantially no silica or silica free.

In another example of aspect 1, the rubber skim composition includes about 20 phr or more of ethylene propylene diene monomer rubber, for example, about 20 to about 80 phr of ethylene propylene diene monomer rubber.

In another example of aspect 1, the rubber skim composition comprises about 1 phr or less of antioxidant.

In another example of aspect 1, the rubber skim composition comprises about 1 phr or less of resin.

In another example of aspect 1, the cord comprises an outer surface, a portion of the outer surface being metallic.

In another example of aspect 1, the support structure comprises an undulating spoke or a continuous loop.

In a second aspect, there is a non-pneumatic tire that includes an annular inner ring, an annular outer ring, a support structure positioned between the annular inner ring and the annular outer ring, wherein the support structure includes a skim layer made of a rubber skim composition, the rubber skim composition includes ethylene propylene diene monomer rubber and the rubber skim composition has a first surface and a second surface, the second surface exposed to the environment around the tire, and a metal cord embedded in the skim layer, the metal cord having an outer surface, the outer surface of the metal cord being in direct contact with the first surface of the rubber skim composition.

In one example of aspect 2, the rubber skim composition further includes about 40 to about 100 phr of natural rubber or polyisoprene and about 20 to about 80 phr of carbon black, and the ethylene propylene diene monomer rubber present at about 20 to about 80 phr.

The second aspect may be provided alone or in combination with any one or more of the examples of the second aspect discussed above, or with any one or more of the examples of the first aspect and examples thereof.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Herein, when a range such as 5-25 (or 5 to 25) is given, this means preferably at least or more than 5 and, separately and independently, preferably not more than or less than 25. In an example, such a range defines independently 5 or more, and separately and independently, 25 or less.

Figure 1:
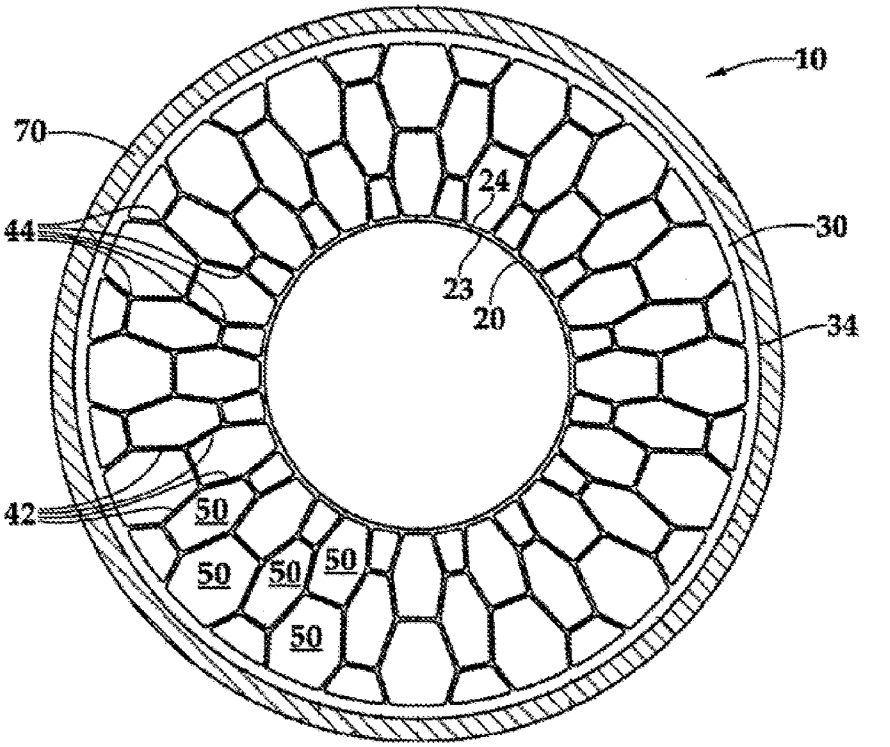
FIG. 1 (Prior Art)
FIG. 1 is a front view of an undeformed non-pneumatic tire known in the prior art.
Figure 2:
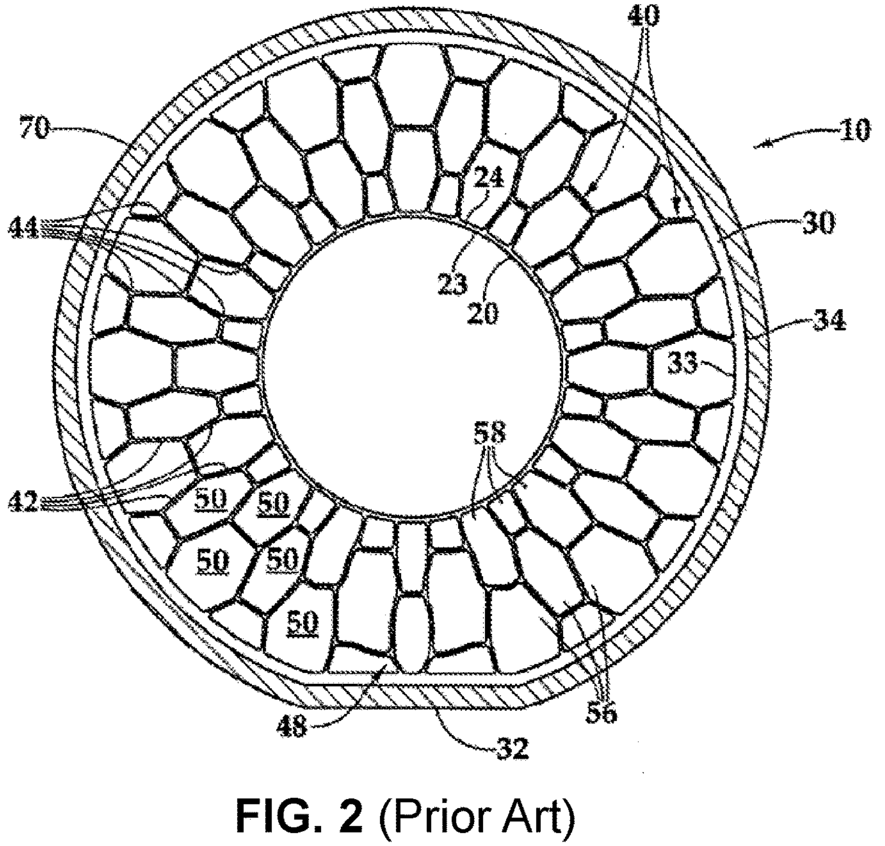
FIG. 2 (Prior Art)
FIG. 2 is a front view of the non-pneumatic tire of FIG. 1 being deformed when subjected to a load.

FIGS. 1 and 2 illustrate an example of a known non-pneumatic tire 10. As shown, the non-pneumatic tire 10 includes a generally annular inner ring 20 that has an internal surface 23 and an external surface 24 and a generally annular outer ring 30 that has an internal surface 33 and an external surface 34. One or both of the annular inner ring 20 and the annular outer ring 30 can be made of cross-linked or uncross-linked polymers or, alternatively, of metal (e.g., steel, aluminum, etc.).

The non-pneumatic tire 10 includes an interconnected web 40 that connects the generally annular inner ring 20 and the generally annular outer ring 30. The interconnected web 40 is a support structure extending radially from the outer surface 24 of the generally annular inner ring 20 to the inner surface 33 of the generally annular outer ring 30. As illustrated, the interconnected web 40 has at least two radially adjacent layers 56, 58 of web elements 42, 44 that define a plurality of generally polygonal openings 50. In alternative embodiments, a plurality of spokes or other open-celled support structure can connect the inner ring 20 to the outer ring 30.

In one embodiment, the generally annular inner ring 20 and the generally annular outer ring 30 are made of the same material as the interconnected web 40. The generally annular inner ring 20, the generally annular outer ring 30, and the interconnected web 40 can be made by injection or compression molding, castable polymer, additive manufacturing, or any other method generally known in the art and can be formed at the same time so that their attachment is formed by the material comprising the inner ring 20, the outer ring 30, and the interconnected web 40 cooling and setting.

The internal surface 23 of the generally annular inner ring 20 is configured to engage a rim assembly (not shown) to which the tire 10 is mounted. A tread layer 70 is attached to the outer surface 34 of the generally annular outer ring 30. Attachment can be done adhesively or using other methods commonly available in the art.

As shown in FIG. 2, the outer ring 30 can be configured to deform in an area 48 around and including a footprint region 32 of the tread layer 70, which decreases vibration and increases ride comfort of the tire 10.

Figure 3:
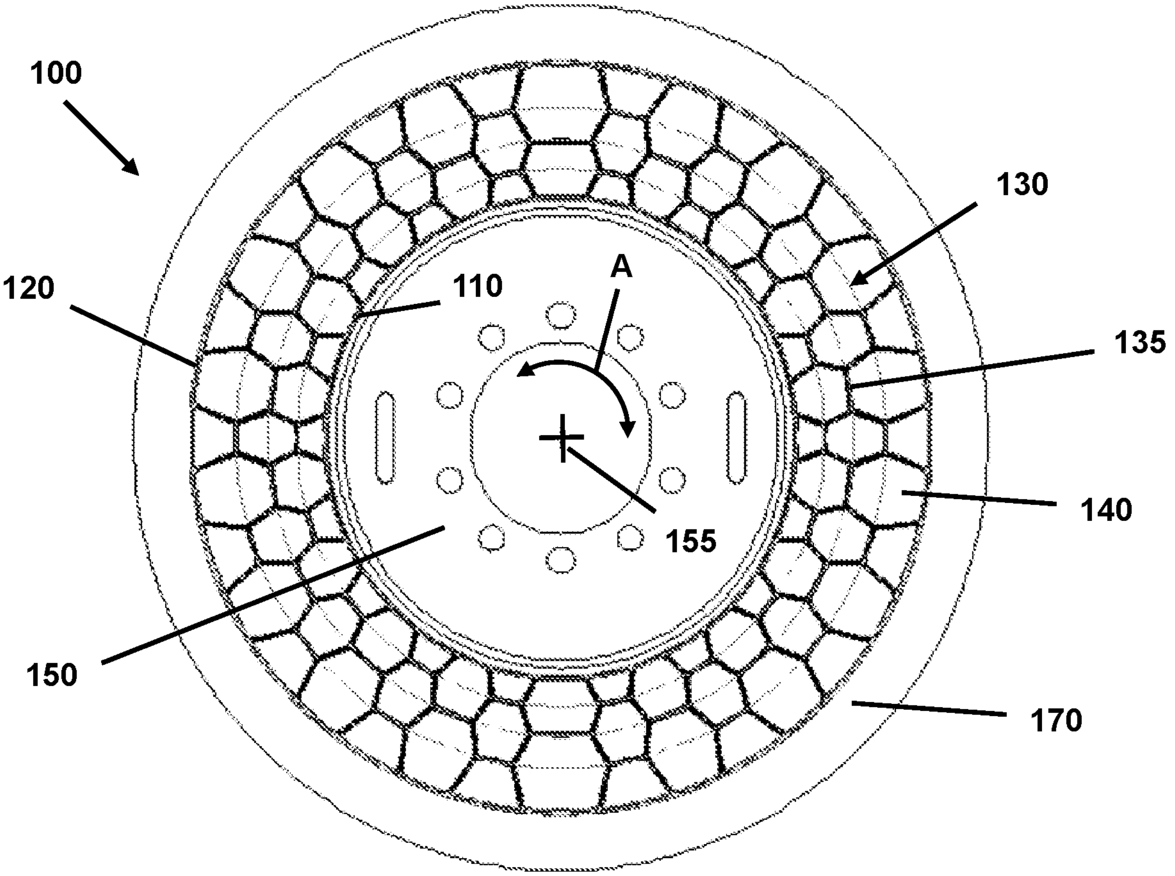
FIG. 3 (Prior Art)
FIG. 3 is a front view of a non-pneumatic tire known in the prior art including a rim assembly.

FIG. 3 illustrates a front view of an embodiment of a known tire 100 having a generally annular inner ring 110, a generally annular outer ring 120, and an internal support structure in the form of a flexible, interconnected web 130 extending between the inner ring 110 and the outer ring 120. The flexible, interconnected web 130 is formed by a plurality of web elements 135 that define polygonal openings 140. The web elements 135 form a plurality of hexagonal and substantially trapezoidal shapes, including an outer series of alternating hexagonal and trapezoidal opening and an inner series of alternating hexagonal and trapezoidal openings. The geometries shown in FIGS. 1-3 are merely exemplary. Similarly, spokes or other support structure may be employed to provide an interconnected web.

FIG. 3 additionally shows the tire 100 mounted on a rim assembly 150 at the generally annular inner ring 110. The rim assembly 150 may be rotated about rotation axis 155 (as shown by arrow A). Rotation can be imparted by an axle of a vehicle, or by other means to rotate the tire 100. A tread 170 is attached to the generally annular outer ring 120. The tread 170 can be manufactured from rubber or other elastomeric material.

FIGS. 4-7 show example embodiments of different types of non-pneumatic tires 200 of the present disclosure. For simplicity, the non-pneumatic tires 200 of FIGS. 4-7 are illustrated without a tread and rim assembly, both of which may be substantially the same as rim assembly 150 and tread 170 described with respect to the tire 100 of FIG. 3. Like reference numerals are used for like components when possible.

Figure 4:
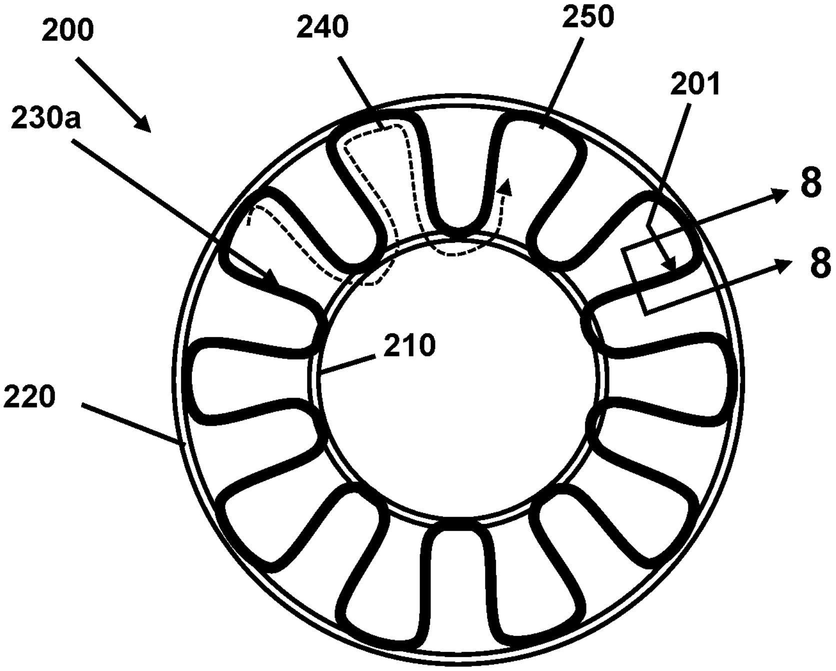
FIG. 4 is a front view of a non-pneumatic tire including an undulating spoke support structure.

FIG. 4 shows an example of a non-pneumatic tire 200 having a generally annular inner ring 210, a generally annular outer ring 220, and an undulating spoke **230*a* positioned and extending between the generally annular inner ring 210 and the generally annular outer ring 220. As shown, the spoke 230*a* is in direct contact with the rings 210, 220. As represented by arrow 240, the undulating spoke 230*a* can be formed by winding a sheet or ribbon 250 of spoke material back and forth between the generally annular inner ring 210 and the generally annular outer ring 220** in an undulating pattern.

Figure 5:
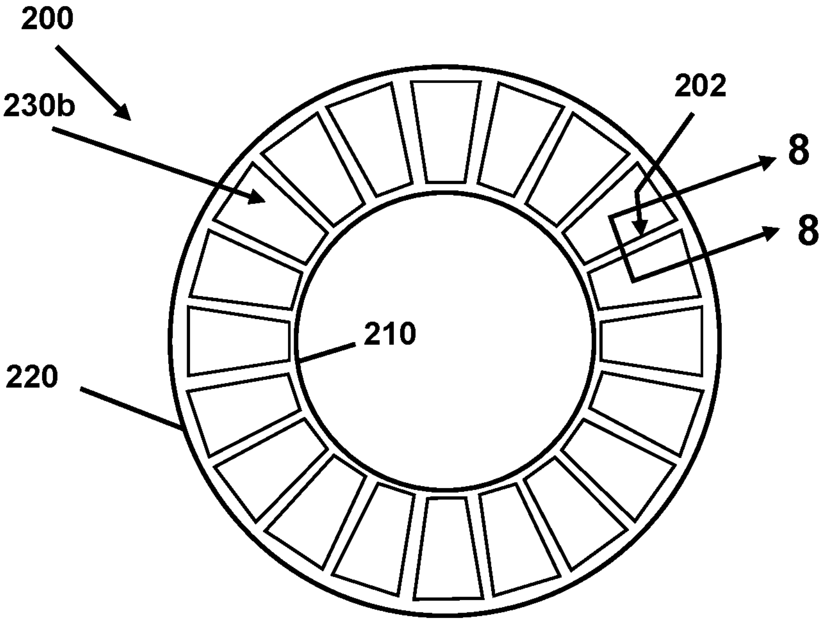
FIG. 5 is a front view of a non-pneumatic tire including a linear spoke structure.

FIG. 5 shows an example of a non-pneumatic tire 200 having a generally annular inner ring 210, a generally annular outer ring 220, and a plurality of linear spokes **230*b* positioned and extending between the generally annular inner ring 210 and the generally annular outer ring 220. In the illustrated embodiment, the plurality of linear spokes 230*b* extend in a substantially radial direction and are in direct contact with rings 210, 220**. In alternative embodiments (not shown), the plurality of linear spokes extend at an angle with respect to the radial direction. In one such embodiment, the plurality of linear spokes are generally parallel to each other. In an alternative embodiment, the plurality of linear spokes extend at diverging angles. The spokes can have different shapes other than shown, for example, oval or cylinders with rounded ends.

The plurality of linear spokes **230*b* can be manufactured by securing a linear spoke 202 between the generally annular inner ring 210 and the generally annular outer ring 220. Alternatively, the plurality of linear spokes 230*b* can be formed, molded, or manufactured to provide each linear spoke 202 as an integral component of the plurality of linear spokes 230*b***. A plurality of spokes can have outer surfaces that abut or directly contact one another, for example, that can be adhered or bonded together.

Figure 6:
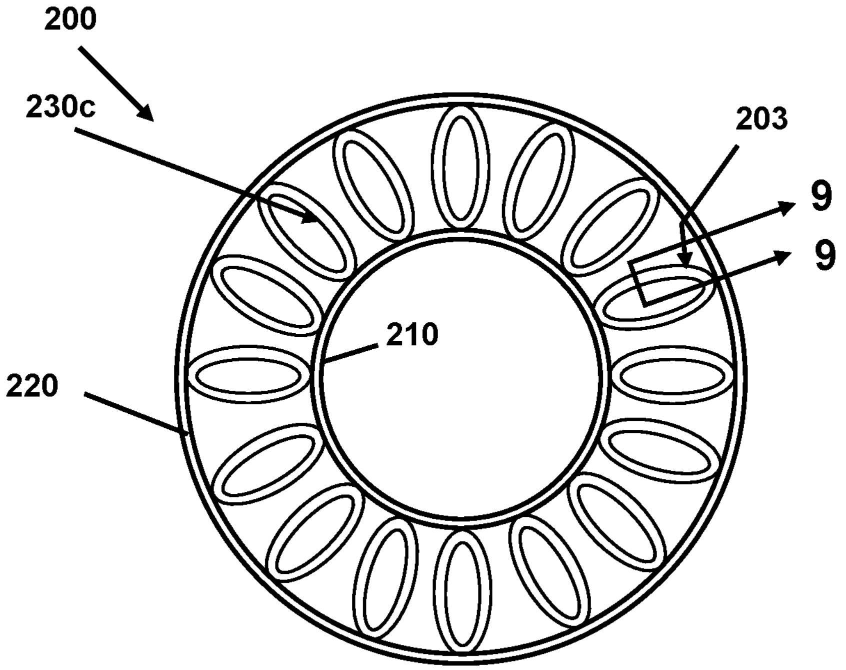
FIG. 6 is a front view of a non-pneumatic tire including a non-linear spoke structure.

FIG. 6 shows an example of a non-pneumatic tire 200 having a generally annular inner ring 210, a generally annular outer ring 220, and a plurality of non-linear spokes 230*c* positioned and extending between the generally annular inner ring 210 and the generally annular outer ring 220. Each non-linear spoke 203 is illustrated as an oval-shaped loop, although other shaped spokes (e.g., circular, rectangular, trapezoidal, polygonal, curved, wave-shaped, irregular-shaped, etc.) may be employed in further embodiments. While non-linear spoke 203 is illustrated as a continuous loop, non-continuous structures (e.g., U-shaped, V-shaped, S-shaped, arc-shaped, etc.) may also be employed. In the illustrated embodiment, each non-linear spoke 203 is radially spaced from adjacent spokes such that there is a space between adjacent spokes. The plurality of non-linear spokes 230*c* can be manufactured by securing each non-linear spoke 203 between the generally annular inner ring 210 and the generally annular outer ring 220.

Figure 7:
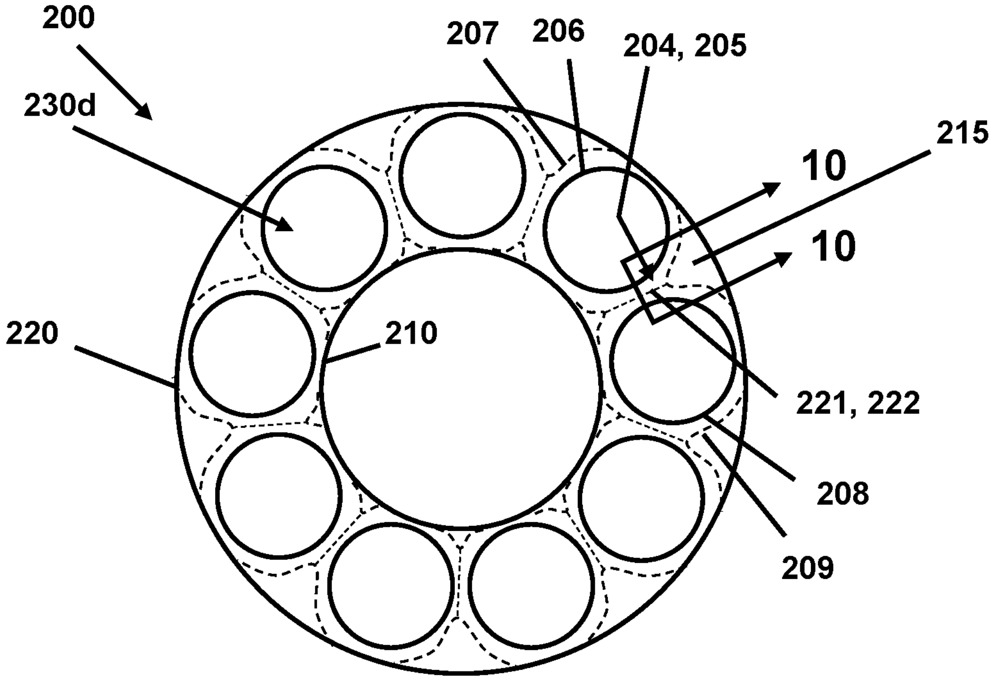
FIG. 7 is a front view of a non-pneumatic tire including a spoke structure including an interface of skim layers.

FIG. 7 shows an example of a non-pneumatic tire 200 having a generally annular inner ring 210, a generally annular outer ring 220, and a plurality of spokes 230*d* extending between the generally annular inner ring 210 and the generally annular outer ring 220. Each spoke 204, 205 is formed as the structure between at least two adjacent voids 206, 208. In the illustrated embodiment, each spoke 204, 205 is the structure between adjacent circular voids 206, 208, although other shaped voids (e.g., oval, rectangular, trapezoidal, polygonal, etc.) may be employed in further embodiments. The voids 206, 208 can be formed, molded, or manufactured into the plurality of spokes 230*d* to provide the plurality of spokes 230*d* as an integral component. Alternatively, the plurality of spokes 230*d* can be manufactured by securing a plurality of continuous structures (e.g., circular, rectangular, trapezoidal, polygonal, etc.) or non-continuous structures (e.g., U-shaped, V-shaped, S-shaped, arc-shaped, etc.) between the generally annular inner ring 210 and the generally annular outer ring 220.

For example, as represented by the dashed lines in FIG. 7, the plurality of spokes 230*d* may be formed by securing a first circular loop 207 and a second circular loop 209 between the generally annular inner ring 210 and the generally annular outer ring 220 with the first circular loop 207 contacting the second circular loop 209 at an interface 221, 222. The first circular loop 207 and the second circular loop 209 can be coupled together at the interface 221, 222 by one or more of a mechanical fastener (e.g., bolt, clamp, bracket), adhesive (e.g., glue, welding, brazing, or a chemical bonding process, which may include heating, vulcanizing, or other method of coupling).

In some embodiments, the method of coupling the first circular loop 207 and the second circular loop 209 may fuse materials of the first circular loop 207 with materials of the second circular loop 209, for example, the outer surfaces of two rubber skim layers, to form the interface 221 as a continuous boundary, such as two rubber skim layers bonded or adhered to one another. Alternatively, in some embodiments, the method of coupling the first circular loop 207 and the second circular loop 209 may form the interface 222 as a non-continuous boundary. Irrespective of whether the interface 221, 222 of the support spoke structures 204, 205 is continuous or non-continuous, additional material 215 may optionally be added between the first circular loop 207 and the second circular loop 209 to fill gaps and provide additional support to the multilayer spoke 204, 205. Additional material 215 can be the same or different material than used for the rubber skim layer.

While FIGS. 4-7 show non-pneumatic tires having support structures as spokes, it should be understood that non-pneumatic tires may have other support structures such as an interconnected web. For example, an interconnected web may be formed by a lower set of spokes and an upper set of spokes, each set of spokes being similar to one of the embodiments shown or described above. A web support structure, like the spokes described above, can use rubber skim layers to embed reinforcing members such as cords.

Figure 8:
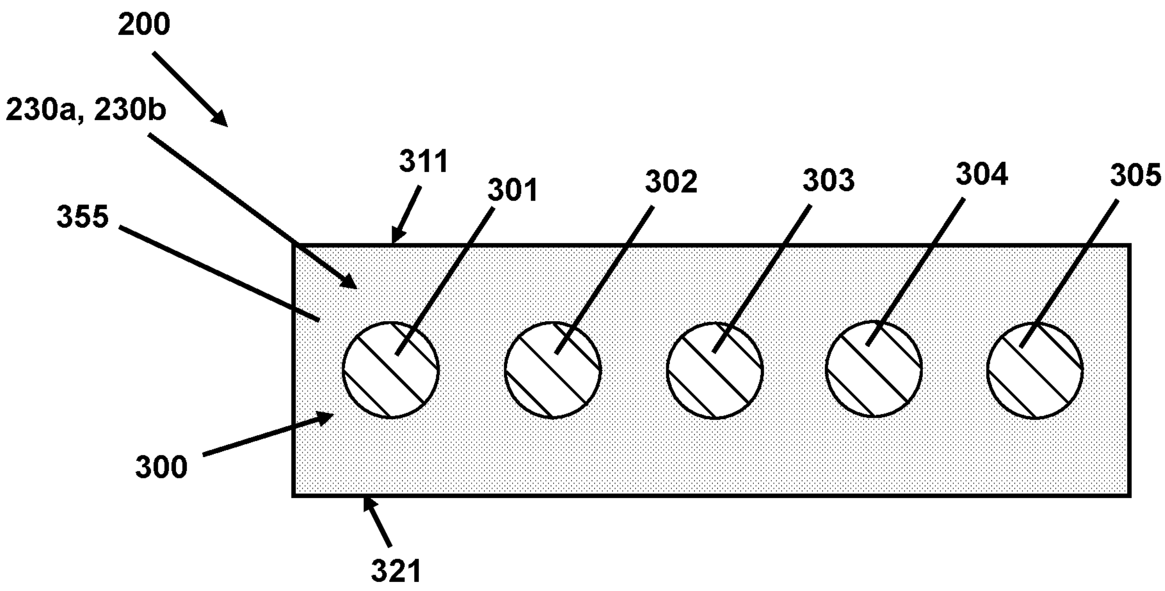
FIG. 8 is a partial cross-sectional view of a spoke of FIG. 4 taken along line 8-8 of FIG. 4 showing a cross-sectional view of a undulating spoke support that is also representative of a partial cross-sectional view of a spoke of FIG. 5 taken along line 8-8 of FIG. 5 showing a cross-sectional view of a linear spoke structure.

FIG. 8 shows a cross-sectional view of a portion of the non-pneumatic tire 200 taken along line 8-8 of FIG. 4 showing undulating spoke 230*a*. The spoke 230*a* includes a plurality of reinforcement members, shown exemplarily as cords 300, embedded in a rubber skim layer 355. Each example cord 301, 302, 303, 304, 305 of the plurality of cords 300 may be constructed of metal (e.g., steel, plated or coated steel, brass, brass-plated steel) to provide structural support and reinforcement to the undulating spoke 230*a*. Other examples of materials from which one or more of the plurality of cords 300 may be constructed include polymeric materials, thermoplastic polymer resins such as polyethylene terephthalate (PET), nylon, rayon, natural cotton, or other tire reinforcement material or combination thereof. The rubber skim layer 355 may be a rubber compound formulated to adhere to the cords 301-305 descried as the rubber composition below. For example, the skim layer 355 may be a rubber composition, for example, a composition including cobalt formulated to adhere to brass-plated steel cords 301-305. Other examples of rubber compositions formulated to adhere to the plurality of cords 300 from which the skim layer 355 may be constructed include resorcinol formaldehyde latex chemistry in the case of a polymeric reinforcing material. Preferably the rubber skim layer 355 provides the support structure (e.g., spoke 230*a*) with improved resistance to ozone degradation. That is, rubber skim layer 355 preferably has properties for surface applications, for instance, withstanding exposure to the ozone in the environment that the support structure is exposed during operation of the tire. The rubber skim layer 355 is preferably a single layer between contact with the embedded reinforcement members (e.g., 301) and exposure to the environment. That is, the rubber skim layer 355 can be free of an outer protective layer or layer for providing additional exposure protection, such as withstanding exposure to ozone, and be in direct contact with the embedded reinforcement members of the spoke.

The open-sided support structure (i.e., undulating spoke 230*a*) of a non-pneumatic tire 200 undergoes various loading conditions in operation and is, therefore, constructed to undergo such loading. For example, the plurality of cords 300 embedded in the skim layer 355 may be constructed to undergo such loading. Moreover, air, road dirt, water, snow, sand, mud, or other debris can come into contact with or accumulate on the undulating spoke 230*a*. While the undulating spoke 230*a*, including the plurality of cords 300 and the skim layer 355, is constructed of materials selected to provide desirable structural characteristics, certain materials degrade when exposed to environmental factors (e.g., ozone). In particular, the skim layer 355 is designed to be suitable for exposure to ozone. Further, the skim layer 355 is formulated to adhere to the cords 301-305. Such formulation, while providing good adhesion to the cords 301-305, can surprisingly also render the skim layer 355 sufficient to prevent degradation from ozone exposure as a single layer surface application composition. Although it was believed that formulating the skim layer 355 to be more ozone resistant could reduce the adhesion characteristics of the skim layer 355 relative to the plurality of cords 300, the present disclosure achieves rubber compositions that accomplish both criteria.

Figure 9:
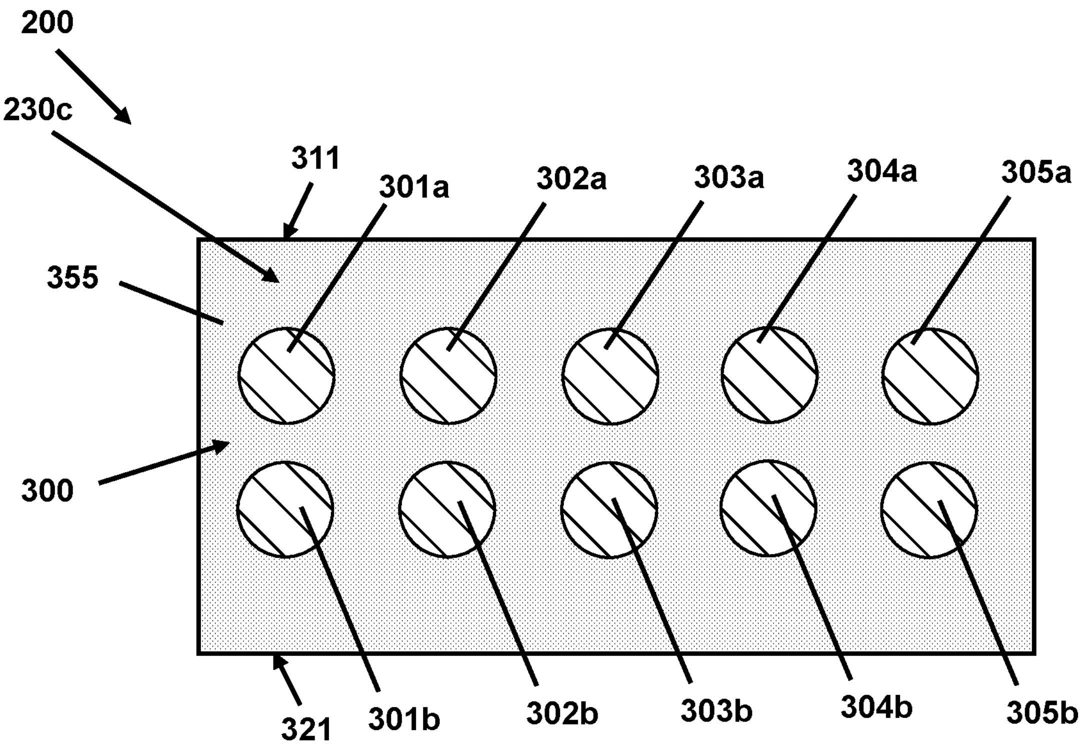
FIG. 9 is a partial cross-sectional view of a spoke of FIG. 6 taken along line 9-9 of FIG. 6 showing a cross-sectional view of a non-linear spoke.
Figure 10:
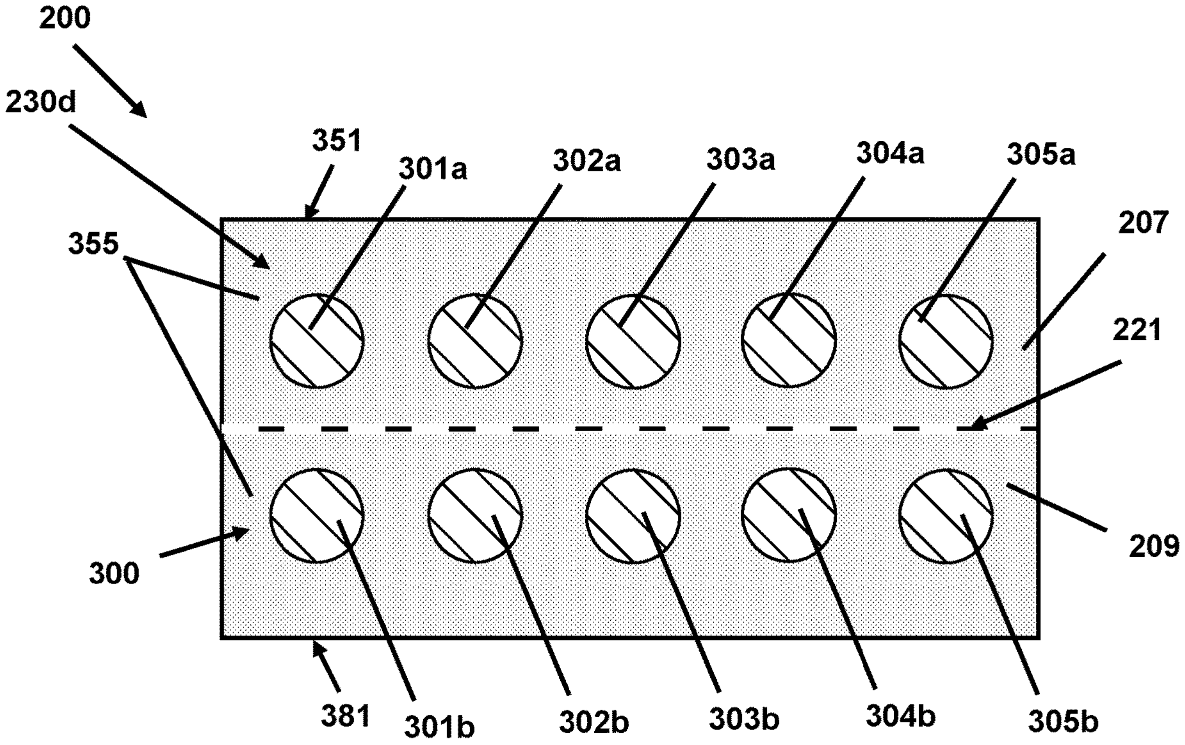
FIG. 10 is a partial cross-sectional view of one embodiment of a spoke of FIG. 7 taken along line 10-10 of FIG. 7 showing a cross-sectional view of a spoke structure including an interface of skim layers.

Additional features of spokes 201-205 for a non-pneumatic tire 200 are described with respect to FIGS. 8-10 with the understanding that one or more features of one or more spokes 201-205 can be provided alone or in combination to provide a spoke for a non-pneumatic tire 200 without departing from the scope of the disclosure. Thus, one or more features of one or more spokes 201-205 can be provided alone or in combination to provide one or more of the spoke structures 130, 230*a*, 230*b*, 230*c*, 230*d* discussed with respect to FIGS. 3-7. Accordingly, the spokes 201-205, embedded in a single rubber skim layer (e.g., 355), for a non-pneumatic tire 200 of the present disclosure are capable of undergoing the various tire loading conditions while also withstanding exposure to harmful environmental factors.

Referring to FIG. 8, the undulating spoke 230*a* includes rubber skim layer 355 embedding the cords 301, 302, 303, 304 and 305 and thus covering any outer surfaces of the cords with respect to the environment. The cross-sectional view of FIG. 8, showing the cross-sectional view of a portion 201 of undulating spoke 230*a* taken along line 8-8 of FIG. 4 is also illustrative of the cross-sectional view of the linear spoke 202 taken along line 5-5 of FIG. 5. For simplicity and not limitation, features of the multilayer spokes 230*a*, 230*b* in FIG. 4 and FIG. 5 will be described in FIG. 8 with respect to the portion 201 of undulating spoke 230*a* of FIG. 4 with the understanding that the features apply in a same or similar manner with respect to linear spoke 202 of FIG. 5. Additionally, it should be understood that the cross-section shown and described with respect to FIG. 8 may be applied to any of the support structures for non-pneumatic tires shown or described above.

As shown in FIG. 8, the rubber skim layer 355 includes a first outer layer surface 311 exposed to the environment and a second outer layer surface 321 exposed to the environment. As shown, the rubber skim layer 355 can be provided as a single, continuous protective layer circumscribing the outer surfaces of one or more cords of a spoke. Although illustrated as a rectangular cross-section with a rubber skim layer 355 having four sides, the spoke 201 may define other shaped cross-sections (e.g., triangular, square, trapezoidal, polygonal, circular, oval, etc.) such that the rubber skim layer 355 includes one or more sides that both directly adhere to and protect the embedded cords from the harmful factors of the environment. Thus, unless otherwise noted, it should be understood that the rubber skim layer 355 can cover at least a portion of the cords in some embodiments and the entire cord in other embodiments without departing from the scope of the disclosure.

The manner in which the plurality of cords 300 are embedded in the rubber skim layer 355 is not intended to be limiting and can be accomplished with various manufacturing techniques as conventional in the art. For example, the plurality of cords 300 and rubber skim layer 355 can be manufactured by a calendaring process where rollers compress the rubber skim layer 355 and the plurality of cords 300 together to embed the plurality of cords 300 within the rubber skim layer 355. Alternatively, one or more of the rubber skim layer 355, and the plurality of cords 300 may be co-extruded to manufacture the rubber skim layer 355 with the plurality of cords 300 embedded therein. In other examples, although five cords 301-305 are illustrated, it should be understood that the spoke 201 can include any number of a plurality of cords 300 without departing from the scope of the disclosure.

FIG. 9 shows a cross-sectional view of non-linear spoke 203 taken along line 9-9 of FIG. 6 illustrating a non-linear spoke 203 with a plurality of cords 300 arranged in one rubber skim layer 355. The first portion of the layer includes cords 301*a*-305*a* and the second portion of the layer includes cords 301*b*-305*b*. The first layer of cords 301*a*-305*a* is aligned with the second layer of cords 301*b*-305*b*, although in other embodiments, the cords 301*a*-305*a*, 301*b*-305*b* may be offset relative to each other. Additionally, one or more cords of the plurality of cords 300 may contact (e.g., be wound, braided, overlap, or otherwise intertwined) without departing from the scope of the disclosure. Additionally, it should be understood that the cross-section shown and described with respect to FIG. 9 may be applied to any of the support structures for non-pneumatic tires shown or described above.

In the illustrated embodiment, the plurality of cords 300 extend in a radial direction. In an alternative embodiment, the plurality of cords 300 may extend in other directions, such as the axial direction, the circumferential direction, or biased at an angle with respect to the radial direction, without departing from the scope of the disclosure. The plurality of cords 300 may extend in the same direction as the spokes 201-205 or may extend in different directions relative to the direction or directions along which the spokes 201-205 extend.

The plurality of cords 300 are intended to provide structural reinforcement to the rubber skim layer 355, and it is therefore envisioned that any combination, orientation, or configuration of cords 301*a*-305*a*, 301*b*-305*b* embedded within the rubber skim layer 355 is within the scope of the disclosure as is any combination, orientation, or configuration of the spokes 201-205.

FIG. 10 shows a cross-sectional view of a spoke 204 including a continuous interface 221 taken along line 10-10 of FIG. 7. It should be understood that the cross-section shown and described with respect to FIG. 10 may be applied to any of the support structures for non-pneumatic tires shown or described above. In one example, the first circular loop 207 and the second circular loop 209 (see FIG. 7) may be coupled together to form the multilayer spoke 204 with a continuous interface 221. By continuous interface 221 it is meant that the rubber skim layers 355 of adjacent first and second circular loops 207, 209 abut each other and are coupled together according to any one or more of the methods of coupling described with respect to FIG. 7.

As illustrated in FIG. 10, the first circular loop 207 includes a first rubber skim layer 355 with outer surface 351 on its inner diameter and no outer protective layer on its outer diameter. Likewise, the second circular loop 209 includes a second rubber skim layer 355 with outer surface 381 on its inner diameter and no outer protective layer on its outer diameter. Thus, when coupled together, for example by bonding (e.g., vulcanizing together), the outer diameter of the first circular loop 207 (with its rubber skim layer 355 exposed) abuts the outer diameter of the second circular loop 209 (with its rubber skim layer 355 exposed). The respective abutting rubber skim layers 355 of each circular loop 207, 209 define a continuous interface 221 of direct contact with one another, with outer surfaces 351, 381 of the rubber skim layers 355 protecting the cords 301*a*-305*a*, 301*b*-305*b* embedded within the rubber skim layer 355 from exposure to the environment.

The skim layer 355 depicted in the figures discussed above is made of a rubber composition. The term "phr" means parts per hundred parts of rubber by weight, and is a measure common in the art wherein components of a composition (e.g., skim layer) are measured relative to the total of all of the elastomer (rubber) components. The total phr or parts for all rubber components, whether one, two, three, or more different rubber components are present in a rubber composition are defined as 100 phr. Other non-rubber components are generally proportional to the 100 parts of rubber and the relative amounts may be expressed in phr.

The rubber composition includes a rubber component. The rubber component includes a rubber or a rubber mixture, which may also be referred to as a vulcanizable rubber composition when blended with the other components of the rubber composition. The rubber component of the composition can include 100 phr of rubber, which includes at least one rubber. The total amount of all rubbers is considered to be 100 parts (by weight) and is denoted 100 phr.

Both synthetic and natural rubber may be employed within the rubber component of the rubber compositions of the skim layer. These rubbers, which may also be referred to as elastomers, include, without limitation, natural or synthetic poly(isoprene) with natural polyisoprene being preferred, and elastomeric diene polymers including polybutadiene and copolymers of conjugated diene monomers with at least one monoolefin monomer. Suitable polybutadiene rubber is elastomeric and has a 1,2-vinyl content of about 1 to 3 percent and a cis-1,4 content of about 94 to 99 percent. Other butadiene rubbers, having up to about 12 percent 1,2-content, may also be suitable with appropriate adjustments in the level of other components, and thus, substantially any high vinyl, elastomeric polybutadiene can be employed. The copolymers may be derived from conjugated dienes such as 1,3-butadiene, 2-methyl-1,3-butadiene-(isoprene), 2,3-dimethyl-1,2-butadiene, 1,3-pentadiene, 1,3-hexadiene and the like, as well as mixtures of the foregoing dienes. The preferred conjugated diene is 1,3-butadiene.

Regarding the monoolefinic monomers, they include vinyl aromatic monomers such as styrene, alpha-methyl styrene, vinyl naphthalene, vinyl pyridine and the like as well as mixtures of the foregoing. The copolymers may contain up to 50 percent by weight of the monoolefin based upon total weight of copolymer. The preferred copolymer is a copolymer of a conjugated diene, especially butadiene, and a vinyl aromatic hydrocarbon, especially styrene.

In one or more embodiments, the present invention relates to the rubber composition including an elastomer, for example, a single elastomer or a mixture of elastomers, and an ethylene-propylene-diene terpolymer (EPDM). The elastomer, when used with a certain amount, such as about 100 phr or less, about 90 phr or less, about 80 phr or less, about 70 phr or less, or about 65 phr or less relative to the EPDM, or about 40 phr or more, about 45 phr or more, about 50 phr or more, about 55 phr or more, or about 60 phr or more relative to the EPDM, which can achieve ozone resistance and without greatly compromising other properties such as fatigue and adhesion to the cords. The EPDM, when used with a certain amount, such as about 65 phr or less, about 60 phr or less, about 55 phr or less, about 50 phr or less, or about 45 phr or less relative to the non-EPDM elastomer, or about 25 phr or more, about 30 phr or more, about 35 phr or more, about 40 phr or more, or about 45 phr or more relative to the non-EPDM elastomer. In certain embodiments, the non-EPDM elastomer is natural rubber, synthetic polyisoprene or a combination thereof, optionally with other non-EPDM elastomers such as polybutadiene. The natural rubber or polyisoprene can provide improved adhesion to metal cords and crack resistance to the rubber composition.

In one or more embodiments, the non-EPDM elastomer relative to the EPDM polymer are present in the rubber composition in a ratio of about 4:1 to about 2:3, about 3.5:1 to about 2.5:1, about 2.5:1 to about 2:1, about 1.75:1 to about 1.25:1 or about 1.5:1 to about 1:1.

In one or more embodiments, the rubber composition includes a reinforcing filler. By containing one or more reinforcing fillers in the skim layer rubber composition that contacts the reinforcing component (e.g., cord), the skim layer rubber composition can have improved tear strength and degradation resistance. For example, the skim layer can be made of a rubber composition having a blend of reinforcing fillers in contact with one or more reinforcing components such as a plurality of metal cords. A reinforcing filler of the skim layer rubber composition can be selected as carbon black, for example, carbon black having at least one characteristic that enhances the skim's properties, for example, tear strength or resistance to degradation. Selected carbon black can be further blended with other different reinforcing fillers, for instance, silica.

In one or more embodiments, the rubber composition has a total reinforcing filler content in an amount of about 25 to about 80 phr, about 30 to about 70 phr, or about 35, 40, 45, 50, 55 or 60 phr. The reinforcing filler content in the rubber composition can include more than one reinforcing filler, for example, at least two fillers, e.g., a first reinforcing filler and a second reinforcing filler, wherein one of the reinforcing fillers is carbon black. The first and second reinforcing fillers can be different from one another. The first reinforcing filler (e.g., carbon black) can be present in an amount in the range of about 25 to about 65 phr, about 30 to about 60 phr, about 35 to about 55 phr, about 40 to about 50 phr, or about 45 phr. The second reinforcing filler (e.g., silica) can be present in an amount in the range of 0 to about 20 phr, about 1 to about 10 phr, about 2 to about 5 phr, or about 0.1 phr or less. In one or more embodiments, the rubber composition includes a single reinforcing filler, such as carbon black, and can optionally be free of a second filler, for example, silica.

The surface of the carbon black and/or silica may optionally be treated or modified to improve the affinity to particular types of polymers. Such surface treatments and modifications are well known to those skilled in the art.

Additional fillers may also be utilized, including but not limited to, mineral fillers, such as clay, talc, aluminum hydrate, aluminum hydroxide and mica. The foregoing additional fillers are optional and can be utilized in varying amounts from about 1 phr to about 40 phr.

In one or more embodiments, a reinforcing filler can include one or more suitable carbon blacks. Suitable carbon blacks are any conventional carbon blacks, for example, HAF, ISAF and SAF type carbon blacks. Further examples of carbon blacks include N115, N134, N234, N299, N330, N339, N343, N347 and N375 type carbon blacks. Carbon black fillers have a nitrogen specific surface area $N_2SA$, for example, in the range of 70 to 150 $m^2/g$. In another example, the carbon black reinforcing filler has a dibutyl phthalate absorption, for instance, of 60 to 140 ml/100 g. In yet another example, the reinforcing filler has a 300% elongation stress of 0.1 to 1 MPa, 0.2 to 0.8 MPa, or less than 0.8, 0.7, 0.6 or 0.5 MPa. A reinforcing filler can be selected that has one or more of the above characteristics and, for example, all of the noted properties or various combinations thereof. When present in the reinforcing filler, carbon black is in the amount of about 20 to about 65, about 25 to about 60, about 30 to about 55, or about 35 to about 50 phr.

The reinforcing filler includes carbon black, for example, optionally in combination with a non-carbon black filler such as silica. The silica can be any conventional suitable silica. Suitable silicas include precipitated or pyrogenic silica, wet silica (hydrated silicic acid), dry silica (anhydrous silicic acid), calcium silicate, and the like. Among these, precipitated amorphous wet-process, hydrated silicas are preferred. The silica can have a BET surface area and a specific CTAB surface area, for example, 500 $m^2$/g or less, or in the range of 50 to 400, or 100 to 200 $m^2$/g. Some of the commercially available silicas which can be used include, but are not limited to, HiSil 190, HiSil 210, HiSil 215, HiSil 233, HiSil 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil 1165 MP0), and J. M. Huber Corporation. In one example, the silica is present in the reinforcing filler at an amount of about 0.1 to about 10 phr, about 0.5 to about 5 phr, about 1 to about 3 phr, optionally in combination with another non-carbon black reinforcing filler. In another example, silica is present in about 5 phr or less, about 3 phr or less, about 1 phr or less or about 0.5 phr or less in the rubber composition as a reinforcing filler.

The skim layer rubber composition can include other ingredients as known in the art as additives customarily included in rubber compositions for manufacturing tires, for example, such as mixing the various constituent rubbers with various commonly used additive materials such as, for example, sulfur, sulfur donors, peroxides, curing aids, such as accelerators, activators and retarders and processing additives, such as oils, methylene donors, resins including adhesive or tackifying resins and plasticizers, fillers, pigments, fatty acid, zinc oxide, waxes, anti-degradants such as antioxidants and anti-ozonants and peptizing agents (e.g., 2,2-Dibenzamido-Diphenyl Disulfide (DBD)). As known to those skilled in the art the additives mentioned above are selected and commonly used in conventional amounts. Conventional quantities are e.g. quantities of 0.1 to 200 phr.

In one or more embodiments, the skim layer rubber composition can include a curative or cure package. A cure package can include, for example, at least one of: a vulcanizing agent; a vulcanizing accelerator; a vulcanizing activator (e.g., zinc oxide, stearic acid, and the like); a vulcanizing inhibitor, and/or an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

In one example, the skim layer rubber composition may comprise zinc oxide in an amount of about 0.1 to about 10 phr, from about 1 to about 7 phr, or from about 2 to about 5 phr. In other examples, vulcanizing agents and vulcanization accelerators may also be added to skim layer rubber composition. Suitable vulcanizing agents and vulcanization accelerators are known in the art, and may be added in appropriate amounts based on the desired physical, mechanical, and cure rate properties of the skim layer rubber composition. Examples of vulcanizing agents include sulfur and sulfur donating compounds. The amount of the vulcanizing agent used in the rubber composition may, in certain embodiments, be from about 0.1 to about 10 phr, or from about 1 to about 8 phr or less than about 7, 6 or 5 phr.

When utilized, the particular vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio)benzothiazole (MBS), N-tert-butyl-2-benzothiazole sulfonamide (TBBS), N-cyclohexyl-2-benzothiazole sulfonamide (CBS), N-tert-butyl-2-benzothiazolyl sulfenamide (BBS), N,N-dicyclohexyl-2-benzothiazolyl sulfenamide (DCBS), and mixtures thereof. The amount of the vulcanization accelerator to be used is not specifically limited but preferably falls within a range of about 0.5 and about 3 phr.

The skim layer rubber composition can include at least one anti-degradant to protect the rubber from oxidative attack. Anti-degradants can include an antioxidant or antiozonant, and the belt skim composition can include an AO package of at least one anti-degradant. Anti-degradants can include, for example, p-phenylenediamines (PPDs), such as N-(1,3-dimethylbutyl)-N'-phenyl-p-phenylenediamine (6PPD), trimethyl-dihydroquinolines (TMQs), phenolics, alkylated diphenylamines (DPAs), aromatic phosphites, and diphenylamine-ketone condensates or combinations thereof. The anti-degradants or combination of anti-degradants can be present in the rubber composition in a range of about 0.1 to about 8 phr, about 0.5 to about 5 phr or less than about 4, 3, 2, or 1 phr.

In one embodiment, the skim layer rubber composition can include, optionally, one or more adhesion promoters for adhering the rubber composition to the reinforcement (e.g., cords). Metal adhesion promoters are known in the art and can include, for example, metal compound or salt type, in particular cobalt, nickel or lanthanide salts and compounds. Examples of an cobalt compounds that can be mixed in the rubber composition include acid cobalt salts such as cobalt versatate, cobalt neodecanoate, cobalt rhodinate, cobalt naphthenate, cobalt stearate, etc., and fatty acid cobalt/boron complex compounds. The metal salts are employed to improve initial adhesiveness between the skim layer and the metal reinforcing materials in direct vulcanization adhesion generally used for tires and the like. The adhesion promoter or combination of promoters can be present in the rubber composition in a range of about 0.05 to about 5 phr, about 0.1 to about 3 phr, about 0.2 to about 2 phr, or about 0.5, 0.75, 1, 1.25, 1.5 or 1.75 phr.

The methylene donor compound that can be mixed in the rubber composition for the skim layer and includes those generally used in the rubber industry, such as hexakis (methoxymethyl)melamine (HMMM), hexamethylenetetramine (HMT), pentakis(methoxymethyl)methylolmelamine, tetrakis(methoxymethyl)dimethylolmelamine, etc. One alone or two or more kinds of these methylene donor compounds may be used either singly or as combined, and the compounding amount thereof is preferably within a range of about 0.5 phr to about 4 parts phr, more preferably within a range of about 1 phr to about 3 phr or less.

The skim layer rubber compositions may be formed by mixing the ingredients together by methods known in the art, such as, for example, by kneading the ingredients together in a Banbury mixer. For example, the composition may be mixed in at least two mixing stages. The first stage may be a mixing stage where no vulcanizing agents or vulcanization accelerators are added, commonly referred to by those skilled in the art as a non-productive mixing stage. In certain embodiments, more than one non-productive mixing stage may be used. The final stage may be a mixing stage where the vulcanizing agents and vulcanization accelerators are added, commonly referred to by those skilled in the art as a productive mixing stage. The non-productive mixing stage (s) may be conducted at a temperature of 130 °C to 200 °C. The productive mixing stage may be conducted at a temperature below the vulcanization temperature in order to avoid unwanted pre-cure of the rubber composition. Therefore, the temperature of the productive mixing stage should not exceed 120 °C and is typically 40 °C to 120 °C, or 60 °C to 110 °C and, especially, about 75 °C to 100 °C.

In order to demonstrate the practice of the present invention, the following examples have been prepared and tested. The examples should not, however, be viewed as limiting the scope of the invention. Numerous variations over these specific examples are possible without departing from the spirit and scope of the presently disclosed embodiments. More specifically, the particular rubbers, fillers, and other ingredients (e.g., curative package ingredients) utilized in the following examples should not be interpreted as limiting since other such ingredients consistent with the disclosure in the Detailed Description can be utilized in substitution. In other words, the particular rubbers, fillers, and other ingredients as well as their amounts and their relative amounts in the following examples should be understood to apply to the more general content of the Detailed Description.

Example 1

Table 1 below lists the components of rubber compositions made to determine adhesion to a metal reinforcement member and ozone resistance.

TABLE 1

| | Comparative 1 | Comparative 2 | Comparative 3 | Comparative 4 | Example 1 | Example 2 |
|---|---|---|---|---|---|---|
| Natural Rubber | 100 | 100 | | | 80 | 50 |
| DBD | 0.12 | 0.12 | | | 0.1 | 0.06 |
| Total 1 | 100.12 | 100.12 | | | 80.1 | 50.06 |
| EPDM | | | | | 20 | 50 |
| Neoprene | | | 60 | 60 | | |
| ESBR | | | 20 | 20 | | |
| BR | | | 20 | 20 | | |
| Carbon Black | 63 | 45 | 63 | 45 | 45 | 45 |
| Silica | | | 5 | 5 | | |
| Cobalt | 0.8 | 0.8 | 3 | 3 | 0.8 | 0.8 |
| 6PPD | 0.5 | 3 | 3 | 3 | 3 | 3 |
| MgO | | | 3 | 3 | | |
| Resin | | 3 | | | 3 | 3 |
| Stearic Acid | | | 5 | 5 | | |
| ZnO | 6 | 6 | 6 | 6 | 6 | 6 |
| Total 2 | 170.42 | 157.92 | 188 | 170 | 157.9 | 157.86 |
| ZnO | 4 | 4 | 4 | 4 | 4 | 4 |
| TMQ | 0.4 | 0.4 | 0.4 | 0.4 | 0.4 | 0.4 |
| AO | 1 | 1 | | | 1 | 1 |
| HMMM | | 3 | | | 3 | 3 |
| DCBS | 0.8 | 0.8 | 1 | 1 | 0.8 | 0.8 |
| Sulfur | 7.5 | 7.5 | 2 | 2 | 7.5 | 7.5 |
| Total 3 | 184.12 | 174.62 | 195.4 | 177.4 | 174.6 | 174.56 |

The meanings of the abbreviations used in the tables are given below. Note that the numeric value indicated for each component in the tables refers to phr. DBD: 2,2-Dibenzamido-Diphenyl Disulfide; ESBR: emulsion polymerized styrene butadiene rubber; SBR: styrene butadiene rubber; BR: butadiene rubber; 6PPD: as N-(1,3-dimethylbutyl)-N'-phenyl-p-phenylenediamine; TMQ: trimethyl-dihydroquinoline; HMMM: hexakis(methoxymethyl)melamine; DCBS: N,N-dicyclohexyl-2-benzothiazolyl sulfenamide; AO: (2,2'-Methylene-bis(4-Methyl-6-T-Butylphenol)).

Comparative Examples 1-4 and Examples 1-2 were measured for adhesion to a metal cord. Three samples of each example composition were made. One sample was a cured and unaged, vulcanized version of the composition, one sample was an uncured (green) version and aged for 7 days at 40 °C and 80% relative humidity, and one sample was a cured, vulcanized version aged for 7 days at 60 °C and 85% relative humidity with 2% oxygen. Each sample contained an embedded steel cord along its center section. Adhesion force (energy force per cord, Joule) was assessed by the force needed to pull the embedded steel cord out of the rubber sample as shown in Table 2 below.

TABLE 2

| | Comp. Ex. 1 | Comp. Ex. 2 | Comp. Ex. 3 | Comp. Ex. 4 | Ex. 1 | Ex. 2 |
|---|---|---|---|---|---|---|
| Unaged | 3.83 | 10.28 | N/A | N/A | 6.9 | 4.84 |
| 7-day, 60 C, 85% RH, O2 | 1.18 | 1.14 | N/A | N/A | 1.34 | 1.52 |
| 7-day, 40 C, 80% RH | 2.82 | 8.1 | N/A | N/A | 4.3 | 3.99 |

As seen in Table 2, Comparative Examples 3 and 4 did not result in any data as the sample compositions failed to adhere to the metal cords. Examples 1 and 2 provided similar and, in some instances, improved adhesion results as compared to Comparative Examples 1 and 2. Examples 1 and 2 evidence that loading a composition with 20 to 50 phr of EPDM and lowering natural rubber content by an amount EPDM loading can achieve similar and sometimes improved adhesion to non-EPDM compositions. Table 2 further evidences that Examples 1 and 2 provide improved adhesion in samples that are a vulcanized version and aged for 7 days at 60 °C and 85% relative humidity with 2% oxygen to simulate degradation conditions and ozone exposure.

Samples of Comparative Examples 1-4 and Examples 1-2 were made and measured for ozone resistance. Ozone resistance was evaluated by curing 2 mm-thick pads of each example compound and extracting a 1.8 mm-wide, 2 mm-long sample. These samples were subjected to 50 parts per hundred million (pphm) of ozone at either 30 °C or 0 °C for three days, during which samples experienced alternating periods of static elongation at 45% strain and cyclical strain between 15% and 45% at 180 RPM. Ozone resistance was judged based on the size of cracks formed in the samples.

At the 30 °C test, samples for Comparative Examples 1 and 2, and Example 1, all showed many significant cracks in the samples on days 1 and 2, and Comparative Example 1 and Example 1 broke apart on day 3. Sample for Comparative Example 3 broke at day 3 and sample for Comparative Example 4 developed wide cracks at day 3. Sample for Example 2 did not show cracks at days 1, 2 and 3 evidencing that 50 phr of EPDM provides improved ozone resistance as compared to the samples of Comparative Examples 1-4 and Example 1.

At the 0 °C test, samples for Comparative Examples 1 and 2, and Example 1, all showed many significant cracks in the samples on days 1 and 2, and Comparative Example 1 broke apart on day 3, and Comparative Example 2 and Example 1 broke apart on day 4. Sample for Comparative Example 3 broke at day 4 and sample for Comparative Example 4 developed wide cracks at days 3 and 4. Sample for Example 2 did not show cracks at days 1, 2, 3 and 4 evidencing that 50 phr of EPDM provides improved ozone resistance as compared to the samples of Comparative Examples 1-4 and Example 1.

Example 2

Table 3 below lists the components of rubber compositions made to determine adhesion to a metal reinforcement member and ozone resistance.

TABLE 3

| | Example 3 | Example 4 | Example 5 | Example 6 | Example 7 | Example 8 |
|---|---|---|---|---|---|---|
| Natural Rubber | 65 | 65 | 55 | 65 | 65 | 55 |
| DBD | 0.08 | 0.08 | 0.07 | 0.08 | 0.08 | 0.07 |
| Total 1 | 65.08 | 65.08 | 55.07 | 65.08 | 65.08 | 55.07 |
| EPDM | 35 | 35 | 45 | 35 | 35 | 45 |
| Carbon Black | 40 | 40 | 40 | 50 | 50 | 50 |
| Silica | | 5 | | | 5 | |
| Cobalt | 0.8 | 0.8 | 0.8 | 0.8 | 0.8 | 0.8 |
| ZnO | 6 | 6 | 6 | 6 | 6 | 6 |
| Total 2 | 146.88 | 151.88 | 146.87 | 156.88 | 161.88 | 156.87 |
| ZnO | 4 | 4 | 4 | 4 | 4 | 4 |
| TMQ | 0.4 | 0.4 | 0.4 | 0.4 | 0.4 | 0.4 |
| AO | 1 | 1 | 1 | 1 | 1 | 1 |
| DCBS | 0.8 | 0.8 | 0.8 | 0.8 | 0.8 | 0.8 |
| Sulfur | 7.5 | 7.5 | 7.5 | 7.5 | 7.5 | 7.5 |
| Total 3 | 160.58 | 165.58 | 160.57 | 170.58 | 175.58 | 170.57 |

Note that the numeric value indicated for each component in the tables refers to phr.

Examples 3-8 were measured for adhesion to a metal cord. Three samples of each example composition were made. One sample was a cured and unaged, vulcanized version of the composition, one sample was an uncured (green) version and aged for 7 days at 40 °C and 80% relative humidity, and one sample was a cured, vulcanized version aged for 7 days at 60 °C and 85% relative humidity with 2% oxygen. Each sample contained an embedded steel cord along its center section. Adhesion force (energy force per cord, Joule) was assessed by the force needed to pull the embedded steel cord out of the rubber sample as shown in Table 4 below. Notably, an inspection of the steel cords after being pulled out of the rubber samples indicated that all cords exhibited complete coverage of their outer surface by the sample rubbers and received an "A" rating for coverage. The removed steel cords retained a portion of the sample rubber on the entire cord outer surface evidencing that the sample rubber compositions achieved desirable adhesion to the steel cords.

TABLE 4

| | Ex. 3 | Ex. 4 | Ex. 5 | Ex. 6 | Ex. 7 | Ex. 8 |
|---|---|---|---|---|---|---|
| Unaged | 3.40 | 4.14 | 4.26 | 3.34 | 2.13 | 4.45 |
| 7-day, 60 C, 85% RH, O2 | 0.82 | 1.06 | 0.89 | 0.92 | 1.35 | 1.11 |
| 7-day, 40 C, 80% RH | 4.32 | 2.80 | 3.57 | 2.32 | 1.89 | 2.92 |

As seen in Table 4, in addition to providing complete rubber coverage on the cords, Examples 3 through 8 provide similar, and in some instances improved adhesion, in samples that are a vulcanized version and aged for 7 days at 60 °C and 85% relative humidity with 2% oxygen to simulate degradation conditions and ozone exposure as compared to the sample of Comparative Example 2 that did not include EPDM and 45 phr of carbon black.

Samples of Examples 3-8 were made and measured for ozone resistance. Ozone resistance was evaluated by curing 2 mm-thick pads of each example compound and extracting a 1.8 mm-wide, 2 mm-long sample. These samples were subjected to 50 parts per hundred million (pphm) of ozone at either 30 °C or 0 °C for three days, during which samples experienced alternating periods of static elongation at 45% strain and cyclical strain between 15% and 45% at 180 RPM. Ozone resistance was judged based on the size of cracks formed in the samples.

At the 30 °C test, samples for Examples 3-8 did not exhibit cracks on day 1. Samples for Examples 3, 5, 6 and 8 did not exhibit cracks on day 2, whereas samples for Examples 4 and 7 broke apart. Examples 4 and 7, which broke apart first, included 5 phr of silica, whereas the remaining crack-free samples did not include silica. Samples for Examples 3, 4 and 8 broke apart on day 3, and the sample for Example 5 did not show any cracks on day 3.

At the 0 °C test, samples for Examples 4 and 6 showed one crack on day 1, whereas the remaining samples for Examples 3, 5, 7 and 8 were crack free on day 1. On day 2, the sample for Example 7 exhibited significant cracks. On day 3, samples for Examples 4 and 7 exhibited severe cracks evidencing that silica containing compositions broke apart before the samples that were free of silica. Of the remaining samples, those for Examples 3, 5 and 8 remained free of any cracks on day 4, whereas the sample for Example 6 broke apart.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:

an annular inner ring;

an annular outer ring;

a support structure positioned between the annular inner ring and the annular outer ring, wherein the support structure comprises:

a single, continuous skim layer comprising a rubber skim composition, the rubber skim composition comprising 20 to 50 phr of ethylene propylene diene monomer rubber and 50 to 80 phr of natural rubber or polyisoprene, the skim layer forms the entire outer surface of the support structure exposed to the environment, and a cord embedded in the skim layer, the rubber skim composition is in direct contact and adhered with the cord embedded in the skim layer.

2. The non-pneumatic tire of claim 1, wherein the support structure includes a plurality of spokes.

3. The non-pneumatic tire of claim 1, wherein the support structure includes an interconnected web.

4. The non-pneumatic tire of claim 1, wherein the rubber skim composition comprises a first surface and a second surface, the first surface in direct contact with the cord embedded in the skim layer and the second surface exposed to the environment.

5. The non-pneumatic tire of claim 1, wherein the rubber skim composition has a total rubber amount of 100 phr, the total rubber amount consists of the ethylene propylene diene monomer rubber and the natural rubber or polyisoprene.

6. The non-pneumatic tire of claim 1, wherein the rubber skim composition further comprises 0.05 to 5 phr of an adhesion promoter.

7. The non-pneumatic tire of claim 1, wherein the rubber skim composition further comprises 0.5 to 4 phr of a methylene donor compound.

8. The non-pneumatic tire of claim 1, wherein the rubber skim composition is free of silica and comprises 20 to 60 phr of carbon black, 0.05 to 5 phr of an adhesion promoter and 1 phr or less of antioxidant.

9. The non-pneumatic tire of claim 1, wherein the rubber skim composition further comprises 10 to 100 phr of reinforcing filler.

10. The non-pneumatic tire of claim 9, wherein the reinforcing filler comprises 20 to 80 phr of carbon black.

11. The non-pneumatic tire of claim 9, wherein the reinforcing filler comprises 5 phr or less of silica.

12. The non-pneumatic tire of claim 1, wherein the rubber skim composition comprises 40 phr or more of ethylene propylene diene monomer rubber.

13. The non-pneumatic tire of claim 1, wherein the rubber skim composition comprises 1 phr or less of antioxidant and 1 phr or less of resin.

14. The non-pneumatic tire of claim 1, wherein the cord comprises an outer surface, a portion of the outer surface being metallic.

15. A non-pneumatic tire comprising:
- an annular inner ring;
- an annular outer ring;
- a support structure positioned between the annular inner ring and the annular outer ring,
- wherein the support structure comprises:
- a single, continuous skim layer comprising a rubber skim composition, the rubber skim composition comprising 35 to 50 phr of ethylene propylene diene monomer rubber, 50 to 65 phr of natural rubber or polyisoprene, 0.05 to 5 phr of an adhesion promoter, 0.5 to 4 phr of a methylene donor compound and substantially free of silica, and the rubber skim composition comprises a first surface and a second surface, the second surface exposed to the environment and forms the entire outer surface of the support structure, and
- a metal cord embedded in the skim layer, the metal cord comprising an outer surface, the outer surface of the metal cord being in direct contact and adhered with the first surface of the rubber skim composition.

16. The non-pneumatic tire of claim 15, wherein the rubber skim composition further comprises 20 to 60 phr of carbon black.

17. The non-pneumatic tire of claim 1, wherein the rubber skim composition further comprises less than 0.1 phr of silica.

18. The non-pneumatic tire of claim 15, wherein the rubber skim composition has a total rubber amount of 100 phr, the total rubber amount consists of the ethylene propylene diene monomer rubber and the natural rubber or polyisoprene.

* * * * *